United States Patent
Sozzani et al.

(10) Patent No.: US 12,287,857 B2
(45) Date of Patent: Apr. 29, 2025

(54) SYSTEMS AND METHODS FOR PROVIDING TRUSTWORTHINESS SCORES

(71) Applicant: Apple Inc., Cupertino, CA (US)

(72) Inventors: Fabio Sozzani, Santa Clara, CA (US); Isabella M. Funke, San Francisco, CA (US); Frederic Jacobs, St. Sulpice (CH); Brandon J. Van Ryswyk, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 211 days.

(21) Appl. No.: 17/804,814

(22) Filed: May 31, 2022

(65) Prior Publication Data
US 2022/0382838 A1    Dec. 1, 2022

Related U.S. Application Data

(60) Provisional application No. 63/195,471, filed on Jun. 1, 2021.

(51) Int. Cl.
| | |
|---|---|
| *G06F 21/31* | (2013.01) |
| *G06F 21/45* | (2013.01) |
| *G06Q 20/02* | (2012.01) |
| *G06Q 20/40* | (2012.01) |

(52) U.S. Cl.
CPC ............ *G06F 21/316* (2013.01); *G06F 21/45* (2013.01); *G06Q 20/02* (2013.01); *G06Q 20/4016* (2013.01)

(58) Field of Classification Search
CPC ............... G06Q 20/02; G06Q 20/3821; G06Q 20/4016; G06Q 20/00; H04L 9/3297
See application file for complete search history.

(56) References Cited

U.S. PATENT DOCUMENTS

| | | | |
|---|---|---|---|
| 10,942,991 B1 * | 3/2021 | Kidd | ................... G06F 16/9574 |
| 11,257,130 B2 * | 2/2022 | Sengupta | ............. H04L 9/3297 |

(Continued)

OTHER PUBLICATIONS

David Chaum, "Blind Signatures for Untraceable Payments," Department of Computer Science, University of California, Santa Barbara, CA, pp. 199-203, 1998.

(Continued)

*Primary Examiner* — Barbara B Anyan
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to computing security and privacy. In some embodiments, a computing device provides, to a service computing system, a service request that identifies an action and includes an anonymous identifier for a user of the computing device. The computing device receives, from the service computing system, a score request for a trustworthiness score indicative of the user's trustworthiness. In response to receiving the score request from the service computing system, the computing device provides information indicative of the user's identity to a scoring computing system and receives the trustworthiness score and a corresponding score signature from the scoring computing system. In response to receiving the score and the score signature from the scoring computing system, the computing device provides the score to the service computing system.

20 Claims, 9 Drawing Sheets

(56) References Cited

U.S. PATENT DOCUMENTS

| | | | |
|---|---|---|---|
| 2015/0058931 A1* | 2/2015 | Miu | G06Q 20/02 |
| | | | 707/784 |
| 2016/0323105 A1* | 11/2016 | Lee | H04L 9/0863 |
| 2017/0111364 A1* | 4/2017 | Rawat | G06F 21/316 |
| 2019/0102252 A1* | 4/2019 | Baptist | H04L 67/1097 |
| 2019/0370813 A1* | 12/2019 | Bravick | G06Q 20/02 |
| 2020/0014702 A1* | 1/2020 | Dasgupta | G06F 21/45 |
| 2020/0027089 A1* | 1/2020 | Kuchar | G06F 16/1837 |
| 2020/0311734 A1* | 10/2020 | Mardikar | G06Q 20/4016 |
| 2021/0037000 A1* | 2/2021 | Attard | G06N 20/00 |

OTHER PUBLICATIONS

F. Denis, et al., "RSA Blind Signatures draft-wood-cfrg-rsa-blind-signatures-00," Mar. 8, 2021; Network Working Group; Internet-Draft; Intended status: Informational; Expires: Sep. 9, 2021, 20 pages.

* cited by examiner

SYSTEMS AND METHODS FOR PROVIDING TRUSTWORTHINESS SCORES

The present application claims priority to U.S. Prov. Appl. No. 63/195,471, filed Jun. 1, 2021, which is incorporated by reference herein in its entirety.

TECHNICAL FIELD

This disclosure relates generally to computing devices and, more specifically, to improving computing security and privacy.

BACKGROUND

Computing devices, such as phones, tablet, notebooks, etc., may interface with various service providers in order to access various services. As a few examples, these services may include web services, streaming services, banking services, video conferencing services, gaming services, etc. The disclosure herein provides techniques to improve the interaction with these services.

DETAILED DESCRIPTION

Figure 1:
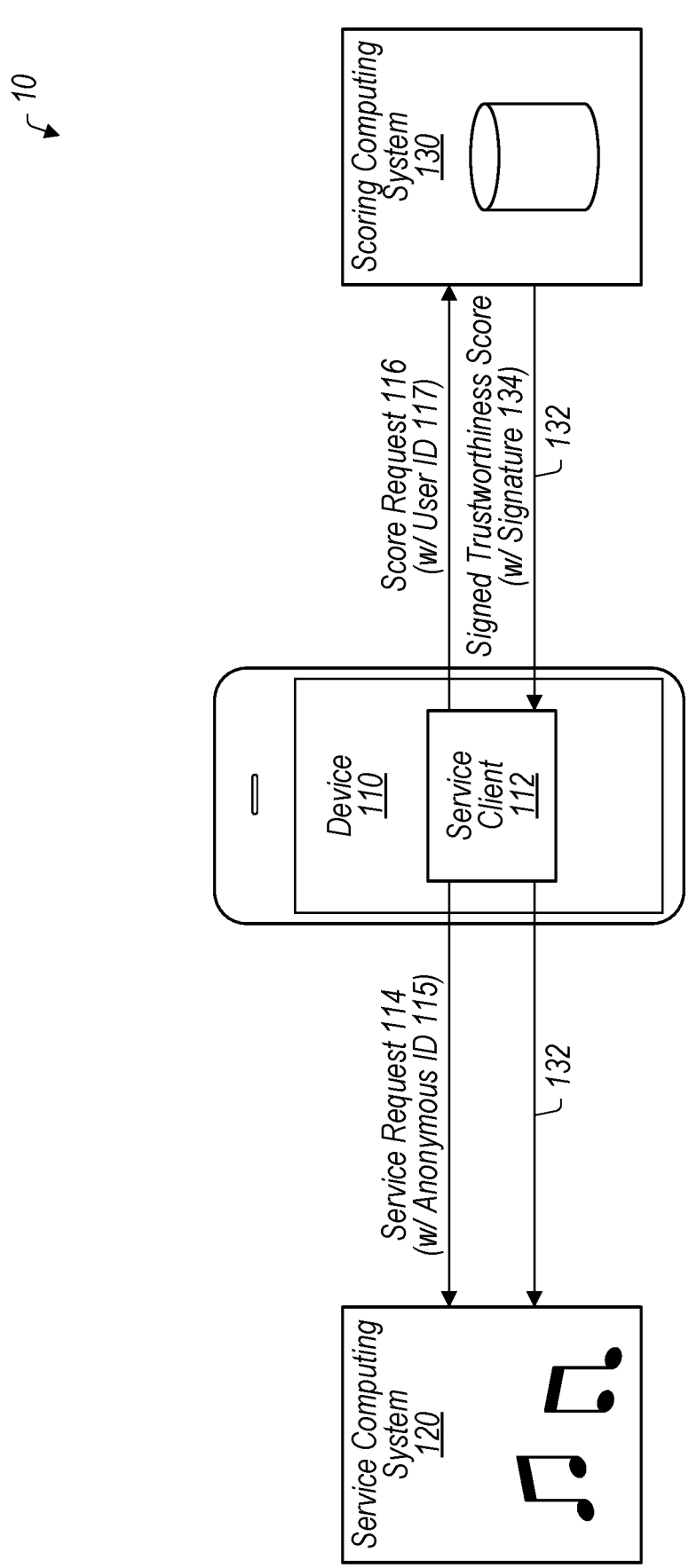
FIG. 1 is a block diagram illustrating an example of a privacy friendly trust assessment system, according to some embodiments.

As not all computing devices interfacing with a given service may be trustworthy, a service provider may utilize a trust assessment system that analyzes the behaviors of interfacing devices and attempts to identify devices that act in a suspicious manner. For example, an actor wanting to boost a video-streaming service's ranking of a particular video might continually replay the same video, which would be an atypical behavior when compared to the behaviors of traditional users. In such an example, the trust assessment system might flag the actor's behavior and reduce the actor's impact on the video's ranking. Accurately assessing a device's or user's trustworthiness may involve tracking various metrics that may be tied to personal information about a user such as a user identity.

As preserving a user's privacy is also important, devices may implement various techniques to reduce user tracking by restricting what a device reveals about a user. For example, in some embodiments discussed below, a device may present an anonymous identifier for a user, which may obfuscate a user's identity and may periodically be changed. Techniques like these may be helpful in protecting a user's privacy but may inhibit attempts to determine whether a user is trustworthy. Continuing with the example above, an actor wanting to alter a video's ranking may periodically alter its anonymous identifier in order to prevent the continuous viewing from being associated with the same actor.

The present disclosure describes embodiments in which a system is able to determine a user's (or device's) trustworthiness while also preserving a user's privacy. As will be discussed below, a computing device may interface with a computing system that offers some service and wants to assess a trustworthiness of the device's user. The computing device may, however, send a service request that includes an anonymous identifier for a user of the computing device. In various embodiments, the service computing system may respond by sending a score request for a trustworthiness score indicative of the user's trustworthiness. In response to receiving the score request, the computing device may contact a separate computing system that maintains trustworthiness scores for various users (or user's devices) and may provide information indicative of the user's identity to the scoring computing system. In some embodiments, this information may include information that can be used to uniquely identify a user and may be information that a user wants to keep private from the service computing system to avoid potential tracking. In response to providing this information, the computing device may receive a signed trustworthiness score (the trustworthiness score and a corresponding score signature) from the scoring computing system. The computing device may then provide the score to the service computing system, which may use the score to determine whether to grant the device's service request. In some embodiments, as part of providing the score request to the computing device, the service computing system further provide feedback information (e.g., a score adjustment) that can be used by the scoring computing system to adjust its score of the user. The computing device may provide this additional information when it requests a signed score from the scoring computing system.

By using a separate scoring computing system, the computing device can withhold privacy sensitive information that a user may wish keep secret, such as a user's identity, from the service being used. As the scoring computing system may be provided with information indicative of the user's identity, however, the scoring computing system may be in a better position than the service computing system to accurately assess a user's trustworthiness. By being able to provide feedback, the service computing system may still be able to influence the scoring process as the service computing system may still be interacting directly with the user and be able to assess some amount of trustworthiness based on this interaction. In some embodiments, the service computing system may also be able to benefit from a trustworthiness score determined from the feedback from multiple, other services.

Turning now to FIG. 1, a block diagram of a privacy friendly trust assessment system 10 is depicted. In the illustrated embodiment, system 10 includes a computing device 110, service computing system 120, and a scoring computing system 130. Computing device 110 may further include a service client 112. In some embodiments, system 10 may be implemented differently than shown. For example, system 10 may include multiple devices 110 and/or multiple service computing systems 120 benefiting from the use of scoring computing system 130, functionality described below with respect to service client 112 may be implemented by other components of computing device 110 (or more generally system 10), etc.

Computing device 110, in various embodiments, is a computing device configured to access various services provided by other computing systems such as service computing system 120. Device 110 may be a phone, tablet, laptop computer, desktop computer, wearable device, internet of things (IoT) device, or any other suitable device such as those listed below with respect to FIG. 7. Device 110 may also interface with these services using any suitable protocol including wired protocols (such as universal serial bus (USB), Ethernet, Thunderbolt™, etc.) and wireless protocols (such as Wi-Fi®, Bluetooth®, near-field communication (NFC), Zigbee®, etc.). As noted above, in various embodiments, computing device 110 may employ various techniques to preserve the privacy of a user of computing device 110. In the illustrated embodiment, this includes providing an anonymous identifier 115 that obfuscates an identity of the user when making a service request 114. In some embodiments, computing device 110 generates anonymous identifier 115 in response to a request from the user to obfuscate their identity. For example, a user may select a privacy setting in a user interface to enable use of an anonymous identifier 115 with respect to one or more services. In some embodiments, computing device 110 may generate a respective anonymous identifier 115 for each service that device 110 uses in order to prevent tracking across multiple, collaborating services. In some embodiments, computing device 110 may periodically replace anonymous identifiers 115 to prevent tracking over time. In another embodiment, an anonymous identifier 115 might initially be assigned by service computing system 120. In the illustrating embodiment, computing device 110 executes a service client 112, which facilitates interaction with service computing system 120 and/or scoring computing system 130 and may be implemented any suitable manner. For example, in some embodiments, service client 112 may be a component of an operating system executed by the client device 110 and/or be provided by a manufacturer of device 110. In another embodiment, service client 112 may a web applet downloaded and executed by a web browser. In another embodiment, service client 112 may be a third-party application, which implements functionality described herein.

Service computing system 120, in various embodiments, is a computing system configured to provide one or more services to computing devices such as computing device 110. These services may be any suitable type of services such a music streaming service (e.g., as shown in the example depicted in FIG. 1), video streaming service, gaming service, geolocation service, web service, newsfeed service, application store, cloud storage service, podcast service, online store, payment service, banking service, video conferencing service, etc. In some embodiments, service computing system 120 may be accessible to device 110 via a wide area network (WAN) such as the Internet. In some embodiments, service computing system 120 may be locally accessible over a local area network (LAN). In various embodiments, when a device 110 interacts with service computing system 120, system 120 may want to determine whether the user associated with that device 110 is trustworthy. As shown in FIG. 1 and noted above, however, device 110 may interface with service computing system 120 using an anonymous identifier 115, which may make this assessment more challenging. For example, the service computing system 120 might identify untrustworthy behavior with respect to a previous anonymous identifier 115 associated with the user. If, however, the anonymous identifier 115 is then changed, this historical information might be lost if the system 120 were unable to associate the two identifiers 115. As will be discussed, however, service computing system 120 may employ the assistance of scoring computing system 130 to address this issue.

Scoring computing system 130, in various embodiments, is a computing system configured to maintain a database of trustworthiness scores 132 indicative of the trustworthiness of particular users. In some embodiments, a score 132 is a numeric value that is adjusted based on a user's behavior (or their device's behavior) over time. For example, a given score 132 for a user might start at some default value. If the user's behavior is deemed to be trustworthy (e.g., the user is exhibiting normal behavior similar to other trustworthy users), scoring computing system 130 may increase this score 132. If, on the other hand, the user's behavior is exhibiting some untrustworthy behavior (e.g., the user's behavior significantly deviates from normal behavior), scoring computing system 130 may lower this score 132. In the illustrated embodiment, scoring computing system 130 tracks scores 132 based on user identifiers 117. User identifiers 117 may corresponding to any suitable user identity information, which may be indicative of a user's identity and may be something that a user wants to keep private from service computing system 120. In some embodiments, user identifiers 117 include static values assigned to users in order to uniquely identify them. For example, user identifiers 117 may be a username, an account number, login credential, etc. In some embodiments, user identifiers 117 include static values assigned to users' devices that uniquely identify the device 110, type of device 110, etc. In some embodiments, user identifiers 117 are a combination of a user identifier and a device identifier. In some embodiments, user identifiers 117 may include user identity information shared across multiple devices 110 belonging to the same user.

Accordingly, when a computing device 110 wants to access a service provided by service computing system 120, device 110 may provide, via service client 112, a service request 114 to perform some action and including its anonymous identifier 115. As service computing system 120 may condition granting this request 114 on a trustworthiness evaluation, computing device 110 may send a score request 116 including its user identifier 117 to scoring computing system 130, which may use the user identifier 117 to identify the revanent score 132 for the user. Scoring computing system 130 may then provide this score 132 to computing device, which may then covey the score 132 on to service computing system 120 via service client 112. In various embodiments, scoring computing system 130 further signs the score 132 by generating a signature 134 from the score 132 using a private key (as will be discussed below with FIG. 4) in order to preserve the integrity of the score 132. In doing so, scoring computing system 130 may attempt to prevent device 110 (or the user) from modifying or falsifying the score 132 that it provides to service computing system 120. In some embodiments, scoring computing system 130 may adjust a score 132 with a small amount of changing entropy each time the score 132 is requested in order to prevent the same score 132 from being used to track a particular user. In another embodiment, scoring computing system 130 may vary the default value of score 132 when it is initially created to reduce tracking. More details of this exchange will be discussed below with respect to FIGS. 2-5.

In some embodiments, factors used to adjust scores 132 may be assessed by scoring computing system 130, service client 112, or one or more service computing systems 120. Accordingly, in some embodiments, service computing system 120 may provide feedback information (e.g., in the form of score adjustments as will be discussed with FIG. 2) to scoring computing system 130 to affect the value of a user's score 132. In such an embodiment, although service computing system 120 may not have access to a user's identity information, service computing system 120 may still be able to assess some aspects of user's trustworthiness based on its interaction with device 110 including a user's behavior with respect to the provided service. In some embodiments, scoring computing system 130 may incorporate this feedback along with the feedback from other service computing systems 120 that a device 110 may be interacting with in order to improve the accuracy of score 132. In some embodiments, however, service computing system 120 does not provide metadata about the underlying factors used to determine the score adjust in order to reduce the amount of knowledge that system 130 may possess about the user.

By using a separate scoring computing system 130, in various embodiments, a user's privacy can still be preserved with respect to service computing system 120 as device 110 can still interface using anonymous identifier 115. As scoring computing system 130, in various embodiments, has access to user identifying information from device 110, system 130 is able to determine a more accurate score 132, in some instances, than service computing system 120, which may not have access to this information. In some embodiments, the ability of service computing system 120 to provide score adjustments may further improve the accuracy of score 132. In some instances, service computing system 120 withholding of metadata about the underlying factors used to determine this adjustment may afford the user additional privacy protections as someone having access to both systems 120 and 130 may be unable to associate the user's identifier 117 at system 120 with metadata at system 130 without having access to device 110, which, in some embodiments, may be the only entity in system 10 that knows the association of identifiers 115 and 117.

Figure 2:
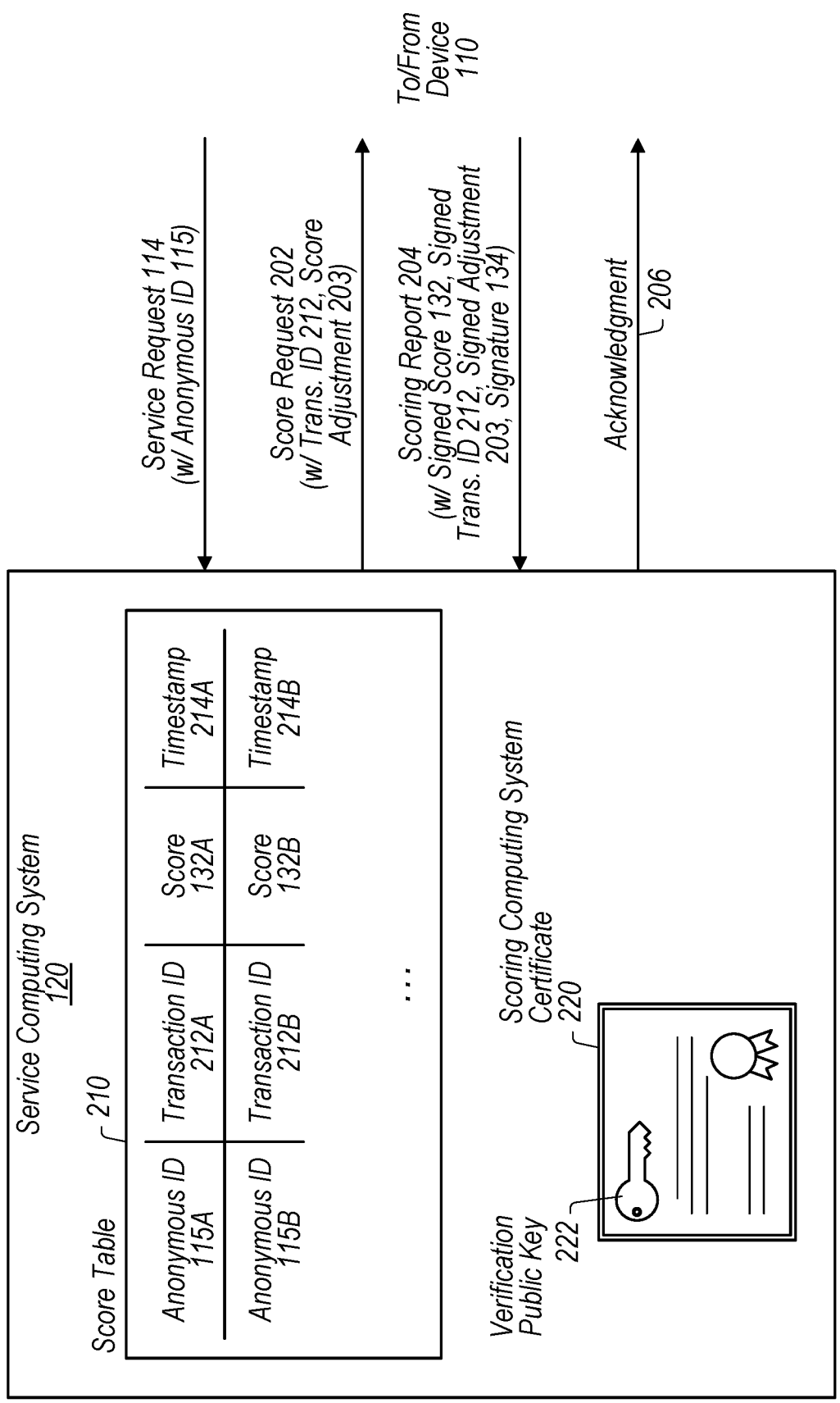
FIG. 2 is a block diagram illustrating an example of a service computing system included in the trust assessment system, according to some embodiments.

Turning now to FIG. 2, a block diagram of service computing system 120 is depicted. In the illustrated embodiment, service computing system 120 includes score table 210 and scoring server certificate 220. Score table 210 further includes anonymous identifiers 115A-B, transaction identifiers 212A-B, scores 132A-B, and timestamps 214A-B. In some embodiments, service computing system 120 may be implemented differently than shown. For example, table 210 may include more (or less) contents, messages 202, 204, and 206 may be implemented differently, etc.

Score table 210, in various embodiments, is used to cache scores 132 received over time from various devices 110. As shown, scores 132 may be stored with their respected anonymous identifiers 115 to facilitate their subsequent lookup. Accordingly, when a service request 114 including an anonymous identifier 115 is received, service computing system 120 may initially determine whether table 210 already possess a corresponding score 132 associated with the identifier 115. If none is found, service computing system 120 may generate a corresponding transaction identifier 212 to be used in a subsequent score request 202. In various embodiments, transaction identifier 212 is information that can be provided for signature in order to associate a received anonymous identifier 115 with a subsequently trustworthiness score 132. In such embodiment, a transaction identifier 212 may be used, in part, so that scoring computing system 130 does not possess a device's anonymous identifier 115 (e.g., for the privacy reasons noted above). As will be discussed with FIG. 3, in some embodiments, computing device 110 may further obfuscate the transaction identifier 212 using a privacy transformation in order to prevent scoring computing system 130 from knowing this additional information. If a score 132 corresponding to a received anonymous identifier 115 is found in table 210, service computing system 120 may examine its corresponding timestamp 214 to determine whether the score 132 is still valid. In various embodiments, a given timestamp 214 is set when a score 132 is received and validated in order to indicate how long the score 132 remains valid. If a valid score 132 is found for a received anonymous identifier 115, service computing system 120 may proceed to evaluate the score 132 and potentially authorize the action requested by service request 114 based on the evaluation of this previously stored score 132. If no valid score 132 is found in score table 210, service computing system 120 may issue a corresponding score request 202 to ask the requesting computing device 110 to obtain a new score 132 from scoring computing system 130.

In some embodiments, a score request (e.g., 202) includes a score adjustment (e.g., 203). In the illustrated embodiment shown in FIG. 2, a given score request 202 includes a transaction identifier 212 and a score adjustment 203. In various embodiments, a score adjustment 203 is a value that is provided by service computing system 120 to scoring computing system 130 to cause it to alter the score 132 that it maintains. Score adjustment 203 may be determined based on any of variety of factors such as user behavior, device behavior, information provided by service client 112, etc. Continuing with the above video-ranking example, system 120 may issue an adjustment 203 that lowers a user's score 132 in response to determining that the user is continuously playing the same video. On the other hand, if the user's behavior seems consistent with other trustworthy users, system 120 may issue an adjustment 203 that raises the user's score 132. Score adjustment 203 may be implemented in any suitable manner. In some embodiments, adjustment 203 may be a previously received score 132 that is alerted by service computing system 120 and provided to scoring computing system 130 to alter the copy of score 132 that it maintains. In some embodiments, adjustment 203 is a value that is be added to (or subtracted from) the score 132 maintained by scoring computing system 130. In some embodiments, score adjustment 203 is a score that is averaged with other scores from other sources to produce a score 132. As noted above, in some embodiments, system 120 may not provide the underlying factors used to determine an adjustment 203, such as user playing the same video, in order to preserve a user's privacy with respect to scoring computing system 130. As will be discussed, in some embodiments, in response to receiving and applying adjustment 203, scoring computing system 130 may generate adjustment verification information by using score adjustment 203 and provide this generated adjustment verification information to facilitate verifying that a received score 132 has been adjusted. In the illustrated embodiment, this verification information includes a signed copy of adjustment 203; in other embodiments, this may include a signed hash of adjustment 203 or some other form of verification information.

After issuing a score request 202, service computing system 120 may receive a corresponding scoring report 204 that includes the requested signed score 132 along with a corresponding signature 134. In response, service computing system 120 may proceed to verify this score 132 using scoring computing system 130's certificate 220 in various embodiments. As shown, certificate 220 includes verification public key 222, which corresponds to the private key used by scoring system 130 to generate signature 134 from score 132. In such an embodiment, service computing system 120 may use this public key 222 to validate signature 134 against score 132 in order to determine that its integrity has been preserved. In some embodiments, the verification of score 132 may further include verifying signed transaction identifier 212 and signed adjustment 203. In additional to verifying transaction identifier 212 and adjustment 203 against signature 134, service computing system 120 may confirm that a corresponding entry in table 210 includes transaction identifier 212. Service computing system 120 may also confirm that adjustment 203 matches the previous sent adjustment 203 in score request 202. In response to successfully verifying score 132, service computing system 120 may store score 132 in table 210 in an entry that includes the previously generated transaction identifier 212.

Service computing system 130 may then proceed to evaluate the verified score 132 and determine whether to grant the service request 114. In some embodiments, this evaluation may include comparing the score 132 against a threshold value in order to ensure that the corresponding user meets some threshold of trustworthiness. If the score evaluation concludes that the user is sufficiently trustworthy, service computing system 130 may determine to grant the request 114 and performed any requested action. In the illustrated embodiment, system 120 also provides an acknowledgment 206, which may include information generated in response to performance of the action. For example, if a user is requesting to stream a particular song, acknowledgment 206 may include the requested song. If the score evaluation concludes that the user is not sufficiently trustworthy, service computing system 120 also send an acknowledgment 206 indicating that request 114 has been declined—and, in some embodiments, may be accompanied with another score request 202 if the evaluation was relying a previously cached score 132 in table 210.

Figure 3:
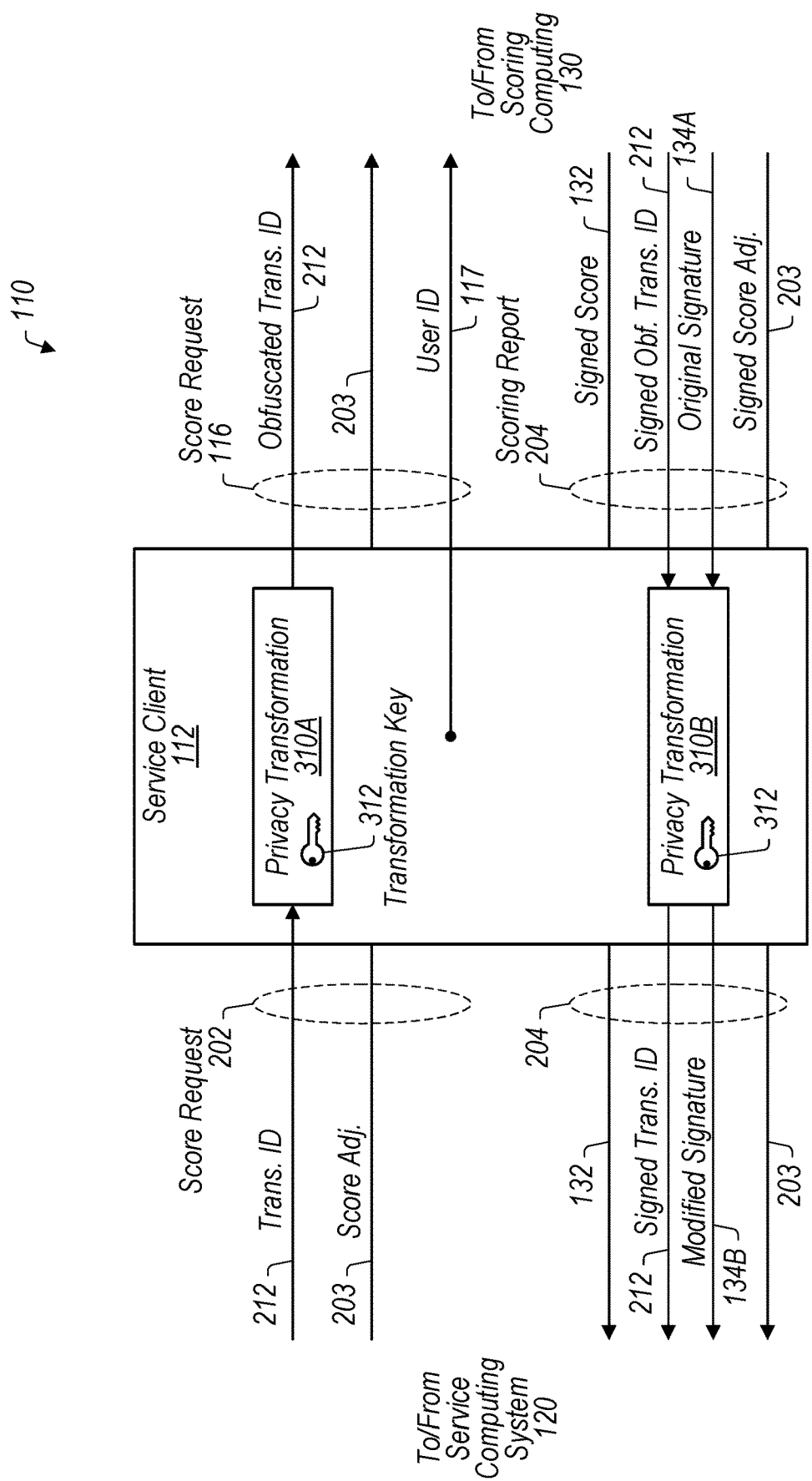
FIG. 3 is a block diagram illustrating an example of a service client included in a computing device of the trust assessment system, according to some embodiments.

Turning now to FIG. 3, a block diagram of service client 112 is depicted. In the illustrated embodiment, service client 112 includes a user identifier 117 and privacy transformations 310A and 310B with a transformation key 312. In some embodiments, service client 112 may be implemented differently than shown. For example, service client 112 may use only a single privacy transformation 310 or may not use a transformation key 312 (or privacy transformation 310B may use a complementary key to key 312); privacy transformations may be implemented by software (or hardware) other than service client 112, etc.

Privacy transformation 310A, in various embodiments, provides a way for service client 112 to obfuscate information that service computing system 120 wants signed with a requested score 132 without revealing that information to scoring computing system 130 in order to preserve a user's privacy. In the illustrated embodiment, this information includes the transaction identifier 212, which, as discussed, may be used by service computing system 120 to associate a returned score 132 with an earlier received anonymous identifier 115. In some embodiments, information passed through privacy transformation 310A can include additional information, which a user may want to keep private from scoring computing system 130, such as an anonymous identifier 115 in another embodiment. Privacy transformation 310A (and 310B discussed next) may be implemented in any suitable manner. In some embodiments, transformation 310A may be implemented by applying hash function to transaction identifier 212 to generate an obfuscated transaction identifier 212, which, in this instances, is the resulting hash value provided to scoring computing system 130 for signature. In some embodiments, transformation 310A is a blinding signature function and/or partially-oblivious verifiable random function that is applied to transaction identifier 212 to generate obfuscated transaction identifier 212. In some embodiments, this blinding function may be implemented in accordance with the blind signature algorithm described in "RSA Blind Signatures" (F. Denis, F. Jacobs, and C. A. Wood, Internet Draft, draft-wood-cfrg-rsa-blind-signatures-00, March 2021); however, in other embodiments, the blinding signature scheme may be implemented differently. In some embodiments, service client 112 uses a transformation key 312 to apply privacy transformation 310A to transaction identifier 212 to generate obfuscated transaction identifier 212. Transformation key 312 may be a random value that is kept secret by service client 112 and later used with privacy transformation 310B. In some embodiments, performing privacy transformation 310B may include using transformation key 312 to calculate an inverse key corresponding to transformation key 312 and applying transformation 310B using the inverse key. As shown, service client 112 may also forward information included in score request 202, such as score adjustment 203, without passing it through privacy transaction 310A when service client 112 sends a corresponding score request 116. Service client 112 may also include additional information in its request 116 such as a user identifier 117.

Privacy transformation 310B, in some embodiments, provides a way for service client 112 to deobfuscate the previously obfuscated information in a manner that still allows a signature 134 received from scoring computing system 130 to be used for verification. In some embodiments in which transformation 310A is a hash function, transformation 310B may include substituting the hash value with the previously received transaction identifier 212. In such an embodiment, service computing system 120 may rehash this identifier 212 when using the signature 134 received from scoring computing system 130 to verify identifier 212. In some embodiments, service client 112 may perform privacy transformation 310B on the signature 134A received from scoring computing device 130 to generate a second signature 134B, which is provided to service computing system 120. As shown, this second signature 134B may be a modified version of the first signature 134A such that signature 134B can still be verified using scoring computing system 130's public key 222. In such an embodiment, transformation 310B may be unblinding function, which may be implemented in accordance with the blind signature algorithm described in "RSA Blind Signatures;" however, in other embodiments, transformation 310B may be implemented differently. In some embodiments, service client 112 reuses transformation key 312 to apply transformation 310B to deobfuscate received information, such as obfuscated transaction identifier 212, and original signature 134A.

Figure 4:
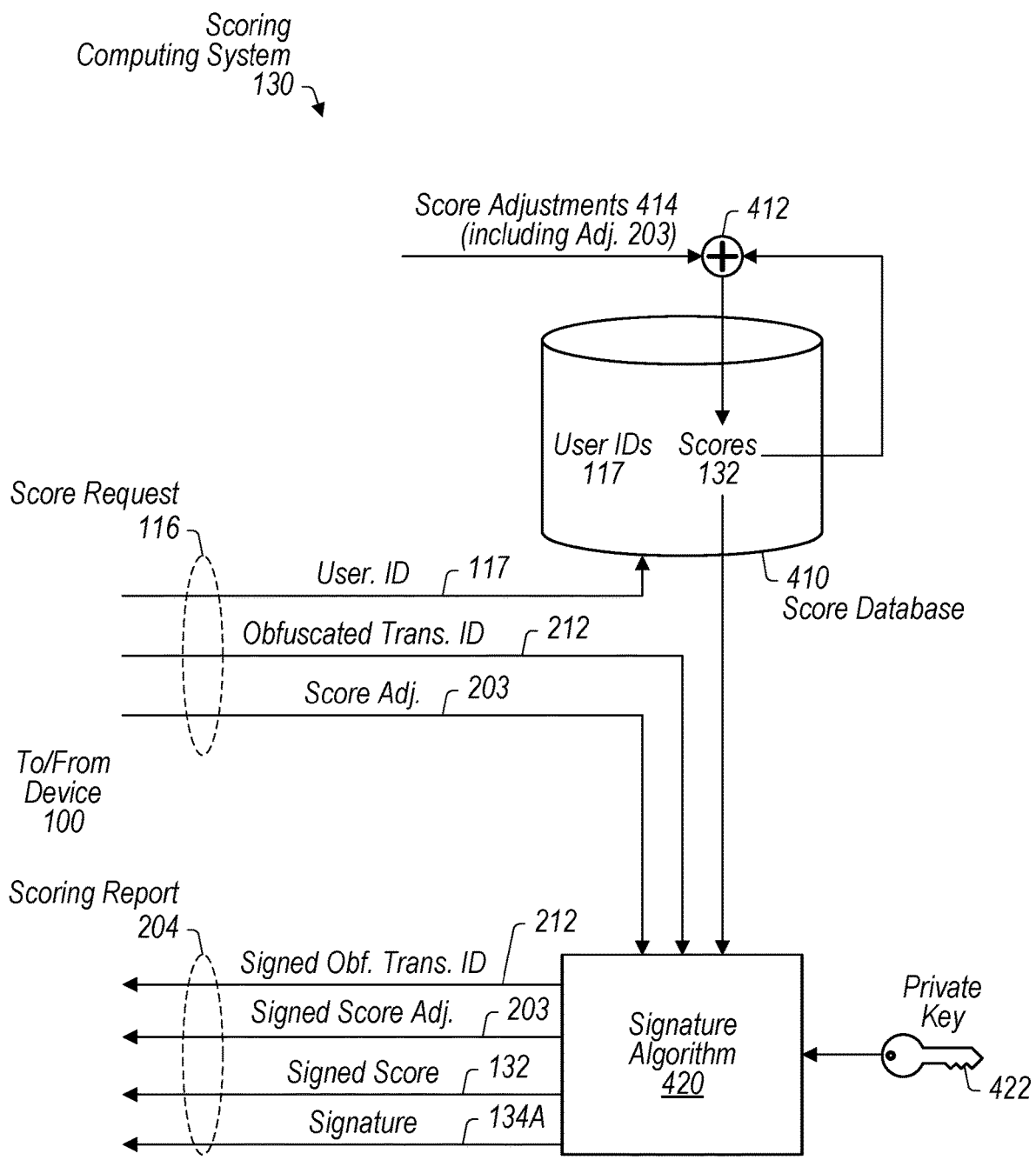
FIG. 4 is a block diagram illustrating an example of a scoring computing system, according to some embodiments.

Turning now to FIG. 4, a block diagram of scoring computing system 130 is depicted. In the illustrated embodiment, scoring computing system 130 includes a score database 410 and signature algorithm 420. In some embodiments, scoring computing system 130 may be implemented differently than shown.

Score database 410, in various embodiments, is a database of multiple scores 132, each associated with a respective user identifier 117. Accordingly, when a score request 116 is received from a computing device 110, system 130 may use the included user identifier 117 to look up the relevant score 132 in database 410. If no score 132 is found, scoring computing system 130 may create one, which may be initialized to some default value. If a score 132 is found (or is newly created), scoring computing system 130 may retrieve this score 132 and apply an adjustment operation 412 to the score 132 to produce an adjusted score 132. In the example depicted in FIG. 4, adjustment operation 412 is an additional operation such that score adjustment 203 is added to score 132. In other embodiments, adjustment operation 412 may be implemented differently such as using a weighted average of adjustments, etc. In some embodiments, the received scoring adjustment 203 may also be one of multiple scoring adjustments 414 applied to the score 132. As noted above, these adjustments 414 may be provided by other service computing systems 120, device 110, scoring computing system 130, or other sources. Once a relevant score 132 has been identified (or created) and adjusted, database 410 may then store this adjusted score 132 and provide the adjusted score 132 to signature algorithm 420 for signing.

Signature Algorithm 420 may correspond to any suitable signature algorithm such as digital signature algorithm (DSA), elliptic curve DSA (ECDSA), Rivest Shamir Adleman (RSA), etc. In various embodiments, algorithm 420 generates a signature 134 from score 132 using private key 422, which is a part of the same public key pair as public key 222 discussed above with FIG. 2. In some embodiments, scoring computing system 130 further signs obfuscated transaction identifier 212 and the score adjustment 203 with the signed score 132 in order to bind them together—thus, signature 134A may be used to verify the collective of elements 212, 203, and 132 in order to ensure that no one element has been modified in an unauthorized manner. In other embodiments, however, scoring computing system 130 may generate multiple signatures 134 may applying algorithm 420 to one or more elements 212, 203, and 132 separately. As computing device 110, in some embodiments, may modify signature 134A using privacy function 310B as discussed above with FIG. 3, signature 134A is shown as a blind signature, which may be unblinded later by device 110. In the illustrated embodiment, scoring computing system 130 communicates this collection of elements 212, 203, 132, and 134 to computing device 110 as scoring report 104.

An exchange implementing the various messages just discussed with FIGS. 2-4 will now be presented.

Figure 5:
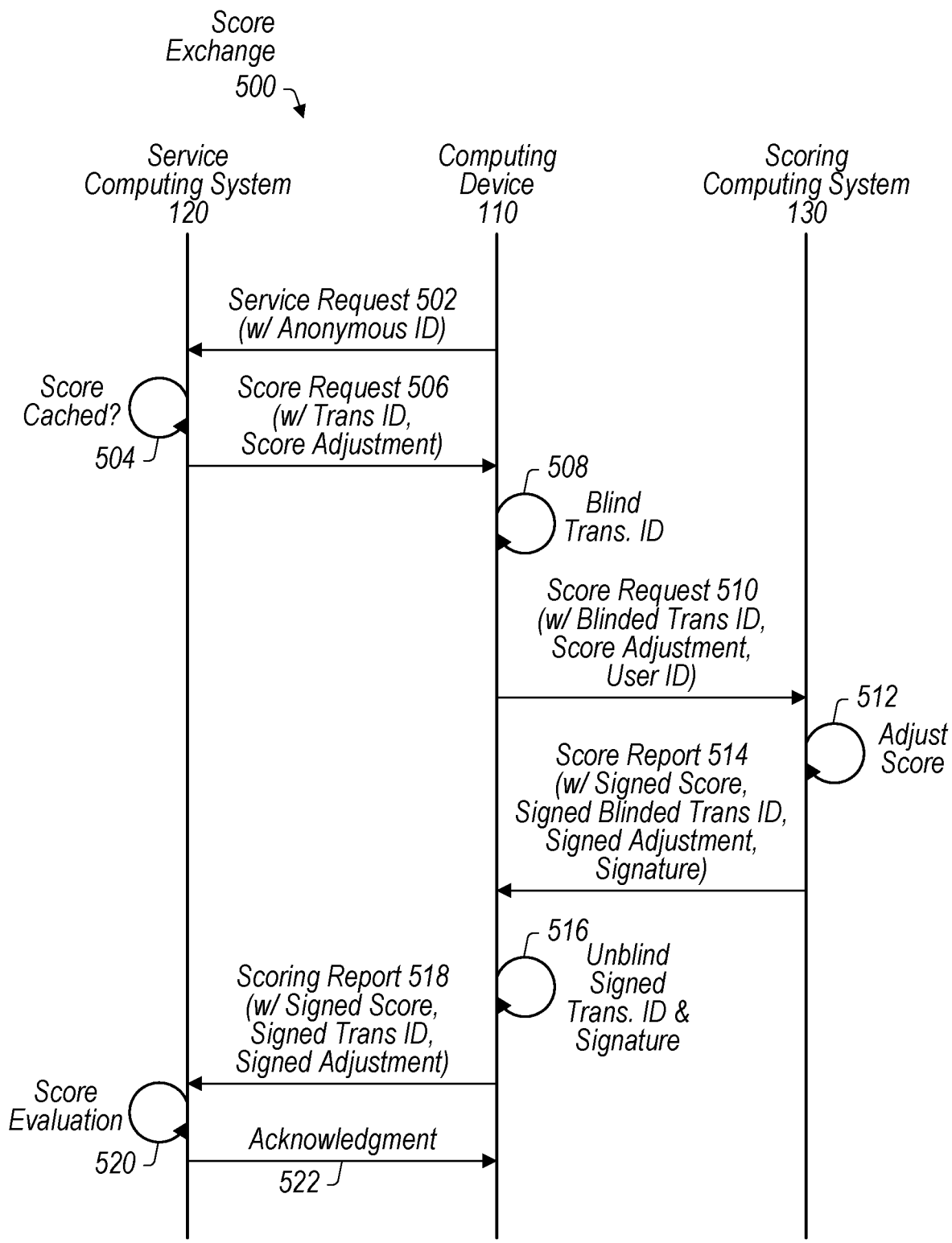
FIG. 5 is a diagram illustrating an example of score exchange performed by components of the trust assessment system, according to some embodiments.

Turning now to FIG. 5, a block diagram of a score exchange 500 is depicted. Scoring exchange 500 is one embodiment of a communication exchange performed by computing device 110, service computing system 120, and scoring computing system 130. In some embodiments, exchange 500 may be implemented differently than shown. For example, device 110 may employ a privacy transformation other than a blinding function, more (or less) messages may be exchanged, messages may include different contents, etc.

Score exchange 500 may begin at 502 with computing device 110 sending a service request 114 with an anonymous identifier 115. In response to receiving this request 114, service computing 120 may examine its score table 210 to see if it has a previously cached score 132 that is associated with anonymous identifier 115 and is still valid. If such a score 132 is present, exchange 500 may proceed to 520 where service computing system evaluates the score 132 to determine whether to service the request 114. If at 504 no valid cached score 132 is identified, service computing system 120 proceeds to issue a score request 202, which may include a transaction identifier 212 and a score adjustment 203. In the illustrated embodiment, in response to receiving this request 202, computing device 110 applies a blinding function, at 508, to the transaction identifier 212 to blind/obfuscate it, so that it cannot be viewed by scoring computing system 130. Computing device 110 may then send a score request 116, at 510, which may include the blinded transaction identifier 212, the score adjustment 203, and a user identifier 117.

In response to receiving the score request 116, scoring computing system 130 at 512 may adjust score 132 that it maintains for the user identifier 117 based on the received score adjustment 203. Scoring computing system 130 may then issue a scoring report 204, at 514, which may include the requested signed score 132, the signed blinded transaction identifier 212, the signed adjustment 203, and a corresponding signature 134A. After receiving this report 204, computing device 110 may apply an unblinding function, at 516, to the signed blinded transaction identifier 212 and the signature 134A to produce reproduce transaction identifier 212 in an unblinded form and a signature 134B that can verify this unblinded form. At 518, computing device 110 forwards on the score report 204 with the signed score 132, the signed transaction identifier 212, the signed adjustment 203, and the signature 134B. At 520, service computing system 120 may verify this report 204 and evaluate the score 132 to determine whether to service the request 114. At 522, service computing system 120 may send an acknowledgment 206 indicating whether the request 114 was granted. In another embodiment, service computing system 120 may not send an acknowledgment 206.

Figure 6A:
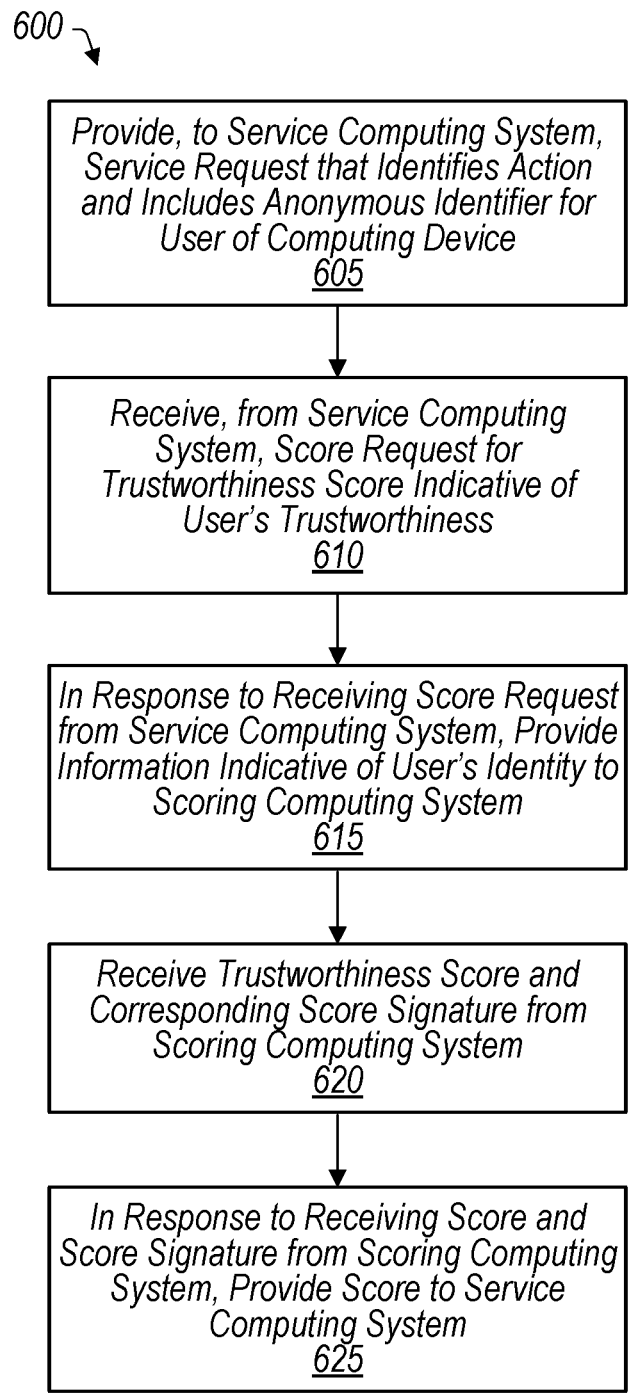
FIGS. 6A-6C are flow diagrams illustrating examples of methods performed by components of the trust assessment system, according to some embodiments.

Turning now to FIG. 6A, a flow diagram of a method 600 is depicted. Method 600 is one embodiment of a method that may be performed by a computing device such as computing device 110. In many instances, performance of method 600 may allow a service computing system to assess a user's trustworthiness without exposing user identifying information to the service computing system.

In step 605, a computing device provides, to a service computing system (e.g., service computing system 120), a service request (e.g., service request 114) that identifies an action and includes an anonymous identifier (e.g., anonymous identifier 115) for a user of the computing device. In some embodiments, the computing device generates the anonymous identifier in response to a request from the user to obfuscate the identity of the user. In another embodiment, the anonymous identifier is initially assigned by the service computing system prior to step 605.

In step 610, the computing device receives, from the service computing system, a score request (e.g., score request 202) for a trustworthiness score (e.g., trustworthiness score 132) indicative of the user's trustworthiness. In some embodiments, the computing device receives, from the service computing system, a score adjustment (e.g., score adjustment 203) determined by the service computing system based the user's interaction with a service provided by the service computing system.

In step 615, in response to receiving the score request from the service computing system, the computing device provides information (e.g., user identifier 117) indicative of the user's identity to a scoring computing system (e.g., scoring computing system 130). In some embodiments, the provided information indicative of the user's identity includes a user identifier that uniquely identifies the user and a device identifier that identifies a type of the computing device. In some embodiments, the computing device receives associating information (e.g., transaction identifier 212) from the service computing system, applies a privacy transformation (e.g., privacy transformation 310A) with a transformation key (e.g., transformation key 312) to the associating information to generate obfuscated associating information, and provides the obfuscated associating information to the scoring computing system. In some embodiments, the associating information received from the service computing system includes a transaction identifier (e.g., transaction identifier 212A) associated with the service request provided to the service computing system. In some embodiments, the computing device provides the score adjustment to the scoring computing system.

In step 620, the computing device receives the trustworthiness score and a corresponding score signature (e.g., signature 134) from the scoring computing system. In some embodiments, the computing device receives, from the scoring computing system, a signed acknowledgment (e.g., signed adjustment 203) indicating that the score adjustment had been received by the scoring computing system.

In step 625, in response to receiving the score and the score signature from the scoring computing system, the computing device provides the score to the service computing system. In some embodiments, in response to receiving the score and the score signature from the scoring computing system, the computing device provides the score signature to the service computing system. In some embodiments, in response to receiving the score and the score signature from the scoring computing system, the computing device generates a second score signature (e.g., signature 134B) by using the score signature (e.g., signature 134A) received form the scoring computing system and provides the second score signature to the service computing system. In some embodiments, the second signature is generated using the transformation key used to apply the privacy transformation. In some embodiments, the computing device provides, to the service computing system, the signed acknowledgement and the adjusted score. In some embodiments, the computing device receives, from the service computing system, information (e.g., an acknowledgment 206) generated in response to performance of the action by the service computing system. In some embodiments, the privacy transformation is a blinding function, generating the second score signature by using the score signature received from the scoring computing system includes applying an unblinding function to the score signature received from the scoring computing system, and second score signature is usable by the service computing system to verify the score as being associated with the service request provided to the service computing system.

Figure 6B:
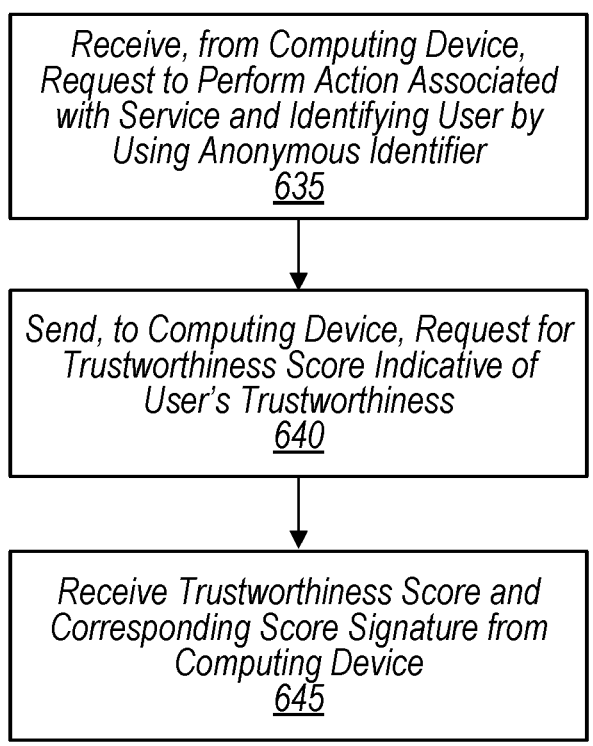

Turning now to FIG. 6B, a flow diagram of a method 630 is depicted. Method 630 is one embodiment of a method that may be performed by a computing system such as service computing system 120. In many instances, performance of method 630 may allow a service computing system to assess a user's trustworthiness without exposing user identifying information to the service computing system.

In step 635, a first computing system (e.g., service computing system 120) receives, from a computing device (e.g., computing device 110), a request (e.g., service request 114) to perform an action associated with a service provided by the first computing system. In various embodiments, the request identifies a user of the computing device by using an anonymous identifier (e.g., anonymous identifier 115) that obfuscates an identity of the user (e.g., user identifier 117).

In step 640, the first computing system sends, to the computing device, a request (e.g., score request 204) for a trustworthiness score (e.g., trustworthiness score 132) indicative of the user's trustworthiness. In some embodiments, the first computing system provides, to the computing device, information for signature (e.g., transaction identifier 212) that associates the anonymous identifier to the requested trustworthiness score. In some embodiments, the first computing system provides, to the computing device, a score adjustment (e.g., score adjustment 203). In some embodiments, prior to sending the request for the trustworthiness score, the first computing device determines whether a trustworthiness score associated with the anonymous identifier has been previously received (e.g., in score table 210), and the request for the trustworthiness score is sent in response determining that the trustworthiness score associated with the anonymous identifier has not been previously received.

In step 645, the first computing system receives the trustworthiness score and a corresponding score signature (e.g., signature 134) from the computing device. In some embodiments, the first computing system authorizes (e.g., via acknowledgment 206) the requested action in response to verifying the score using the score signature. In some embodiments, the first computing system stores (e.g., in score table 210) the score in association with the anonymous identifier and authorizes a subsequently requested action based on the stored score and the anonymous identifier.

Figure 6C:
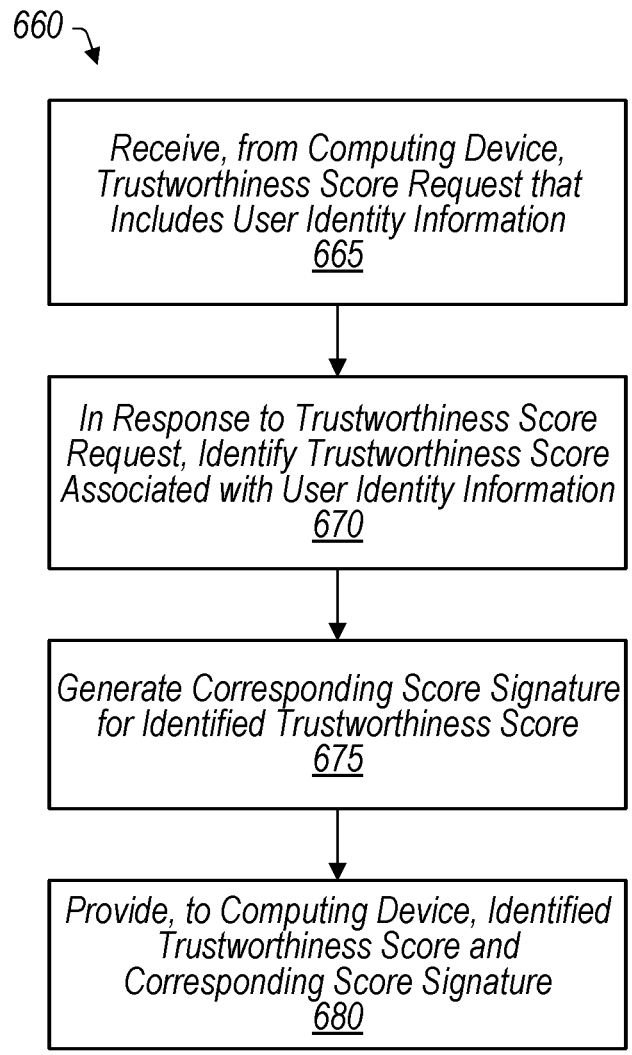

Turning now to FIG. 6C, a flow diagram of a method 660 is depicted. Method 660 is one embodiment of a method that may be performed with a computing system such as scoring computing system 130. In many instances, performance of method 660 may allow a service computing system to assess a user's trustworthiness without exposing user identifying information to the service computing system.

In step 665, a scoring computing system receives, from a computing device (e.g., computing device 110), a trustworthiness score request (e.g., score request 116) that includes user identity information (e.g., user identifier 117).

In step 670, in response to the trustworthiness score request, the scoring computing system identifies a trustworthiness score (e.g., score 132) associated with the user identity information. In various embodiments, the scoring computing system receives, from the computing device, a score adjustment (e.g., score adjustment 203), and identifying a trustworthiness score associated with the user identity information includes adjusting an original trustworthiness score based on the received score adjustment (e.g., via an adjustment operation 412). In some embodiments, the scoring computing system generates adjustment verification information by using the score adjustment received from the computing device and provides, to the computing device, the generated adjustment verification information (e.g., signed score adjustment 203) usable to verify adjustment to the original trustworthiness score based on the received score adjustment. In some embodiments, the scoring computing device receives additional score adjustments (e.g., score adjustments 414) from a plurality of other services being accessed by the user and adjusts the requested trustworthiness score based on the additional score adjustments.

In step 675, the scoring computing system generates a corresponding score signature (e.g., signature 134) for the identified trustworthiness score. In some embodiments, the scoring computing system receives, from the computing device, obfuscated associating information (e.g., obfuscated transaction identifier 212), and generating the score signature includes generating the score signature by using the received obfuscated associating information. In some embodiments, the obfuscated associating information includes information obfuscated by application of blinding function to the associating information.

In step 680, the scoring computing system provides, to the computing device, the identified trustworthiness score and the corresponding score signature.

Exemplary Computer System

Figure 7:
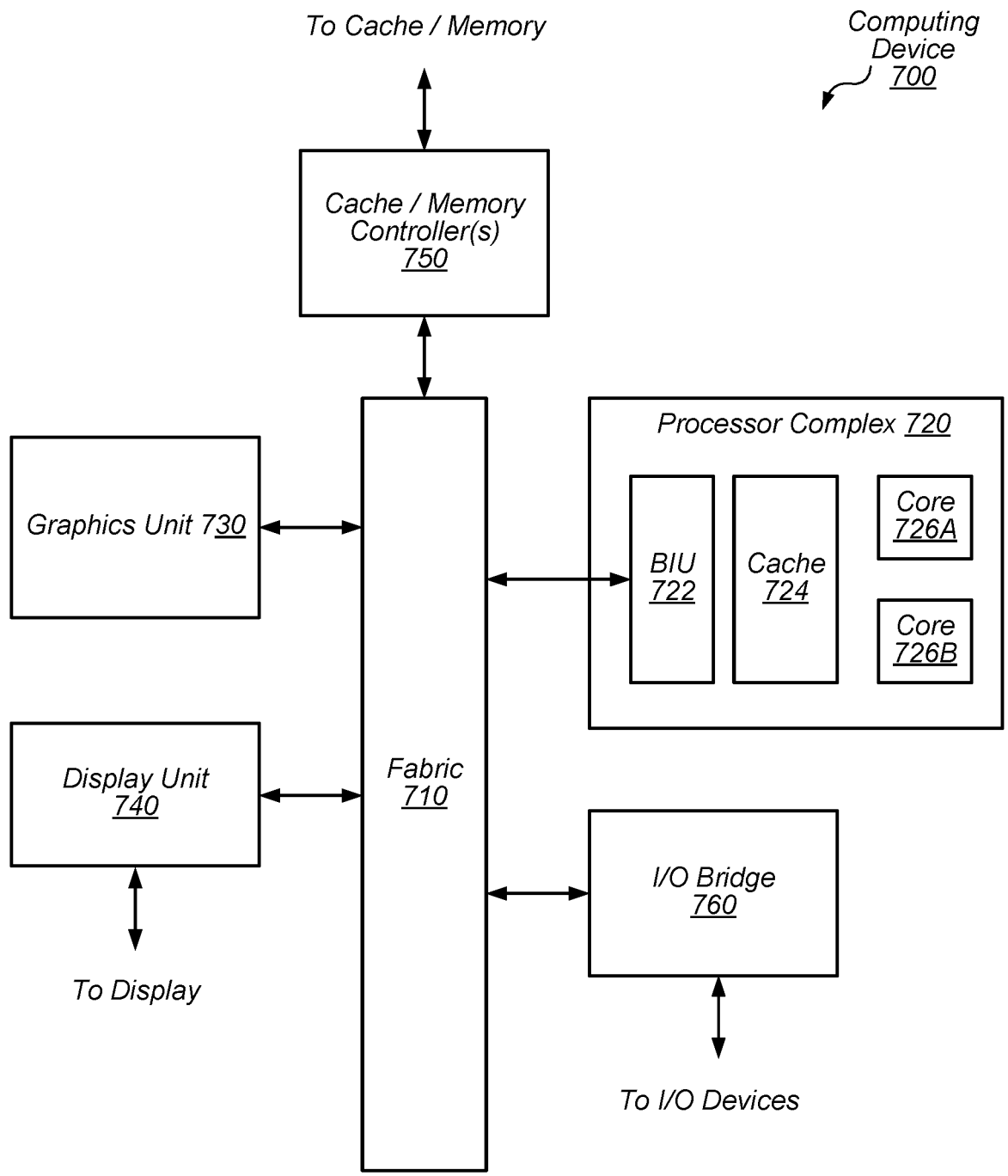
FIG. 7 is a block diagram illustrating an exemplary computing system, according to some embodiments.

Turning now to FIG. 7, a block diagram illustrating an exemplary embodiment of a computing device 700, which may implement functionality of computing device 110, service computing system 120, and/or scoring computing system 130, is shown. Device 700 may correspond to any suitable computing device such as a server system, personal computer system, desktop computer, laptop or notebook computer, mainframe computer system, tablet computer, handheld computer, workstation, network computer, a mobile phone, music player, personal data assistant (PDA), wearable device, internet of things (IoT) device, etc. In the illustrated embodiment, device 700 includes fabric 710, processor complex 720, graphics unit 730, display unit 740, cache/memory controller 750, input/output (I/O) bridge 760. In some embodiments, elements of device 700 may be included within a system on a chip (SOC).

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally. As used herein, the term "coupled to" may indicate one or more connections between elements, and a coupling may include intervening elements. For example, in FIG. 7, graphics unit 730 may be described as "coupled to" a memory through fabric 710 and cache/memory controller 750. In contrast, in the illustrated embodiment of FIG. 7, graphics unit 730 is "directly coupled" to fabric 710 because there are no intervening elements.

In the illustrated embodiment, processor complex 720 includes bus interface unit (BIU) 722, cache 724, and cores 726A and 726B. In various embodiments, processor complex 720 may include various numbers of processors, processor cores and/or caches. For example, processor complex 720 may include 1, 2, or 4 processor cores, or any other suitable number. In one embodiment, cache 724 is a set associative L2 cache. In some embodiments, cores 726A and/or 726B may include internal instruction and/or data caches. In some embodiments, a coherency unit (not shown) in fabric 710, cache 724, or elsewhere in device 700 may be configured to maintain coherency between various caches of device 700. BIU 722 may be configured to manage communication between processor complex 720 and other elements of device 700. Processor cores such as cores 726 may be configured to execute instructions of a particular instruction set architecture (ISA), which may include operating system instructions and user application instructions. These instructions may be stored in computer readable medium such as a memory coupled to memory controller 750 discussed below.

Graphics unit 730 may include one or more processors and/or one or more graphics processing units (GPU's). Graphics unit 730 may receive graphics-oriented instructions, such as OPENGL®, Metal, or DIRECT3D® instructions, for example. Graphics unit 730 may execute specialized GPU instructions or perform other operations based on the received graphics-oriented instructions. Graphics unit 730 may generally be configured to process large blocks of data in parallel and may build images in a frame buffer for output to a display. Graphics unit 730 may include transform, lighting, triangle, and/or rendering engines in one or more graphics processing pipelines. Graphics unit 730 may output pixel information for display images.

Display unit 740 may be configured to read data from a frame buffer and provide a stream of pixel values for display. Display unit 740 may be configured as a display pipeline in some embodiments. Additionally, display unit 740 may be configured to blend multiple frames to produce an output frame. Further, display unit 740 may include one or more interfaces (e.g., MIPI® or embedded display port (eDP)) for coupling to a user display (e.g., a touchscreen or an external display).

Cache/memory controller 750 may be configured to manage transfer of data between fabric 710 and one or more caches and/or memories. For example, cache/memory controller 750 may be coupled to an L3 cache, which may in turn be coupled to a system memory. In other embodiments, cache/memory controller 750 may be directly coupled to a memory. In some embodiments, cache/memory controller 750 may include one or more internal caches. Memory coupled to controller 750 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 750 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by processor complex 720 to cause device 700 to perform functionality described herein such as functionality described with respect to computing device 110 (or more specifically service client 112), service computing system 120, and/or scoring computing system 130.

I/O bridge 760 may include various elements configured to implement universal serial bus (USB) communications, security, audio, and/or low-power always-on functionality, for example. I/O bridge 760 may also include interfaces such as pulse-width modulation (PWM), general-purpose input/output (GPIO), serial peripheral interface (SPI), and/or inter-integrated circuit (I2C), for example. Various types of peripherals and devices may be coupled to device 700 via I/O bridge 760. For example, these devices may include various types of wireless communication (e.g., Wi-Fi™, Bluetooth®, cellular, global positioning system, etc.), additional storage (e.g., RAM storage, solid state storage, or disk storage), user interface devices (e.g., keyboard, microphones, speakers, etc.), etc.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various embodiments described herein may gather and/or use data available from specific and legitimate sources to determine a privacy friendly trustworthiness score. The present disclosure contemplates that, in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to determine a more reliable indicator of a user's trustworthiness. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

What is claimed is:

1. A non-transitory computer readable medium having program instructions stored therein that are executable by a computing device to cause the computing device to perform operations comprising:
   providing, to a service computing system, a service request that identifies an action and includes an anonymous identifier for a user of the computing device;
   receiving, from the service computing system, a score request for a trustworthiness score indicative of the user's trustworthiness;
   in response to receiving the score request from the service computing system, providing a non-anonymous identifier indicative of the user's identity to a scoring computing system;
   receiving the trustworthiness score and a corresponding score signature from the scoring computing system; and
   in response to receiving the score and the score signature from the scoring computing system, providing the score to the service computing system and without providing the non-anonymous identifier indicative of the user's identity to the service computing system.

2. The computer readable medium of claim 1, wherein the operations further comprise:
   in response to receiving the score and the score signature from the scoring computing system, providing the score signature to the service computing system.

3. The computer readable medium of claim 1, wherein the operations further comprise:
   in response to receiving the score and the score signature from the scoring computing system:
      generating a second score signature by using the score signature received from the scoring computing system; and
      providing the second score signature to the service computing system.

4. The computer readable medium of claim 3, wherein the operations further comprise:
   receiving associating information from the service computing system;
   applying a privacy transformation with a transformation key to the associating information to generate obfuscated associating information; and
   providing the obfuscated associating information to the scoring computing system; and
   wherein the second score signature is generated using the transformation key.

5. The computer readable medium of claim 4, wherein the associating information received from the service computing system includes a transaction identifier associated with the service request provided to the service computing system.

6. The computer readable medium of claim 4,
   wherein the privacy transformation is a blinding function,
   wherein generating the second score signature by using the score signature received from the scoring computing system includes applying an unblinding function to the score signature received from the scoring computing system, and
   wherein the second score signature is usable by the service computing system to verify the score as being associated with the service request provided to the service computing system.

7. The computer readable medium of claim 1, wherein the operations further comprise:
   receiving, from the service computing system, a score adjustment determined by the service computing system based on the user's interaction with a service provided by the service computing system; and
   providing the score adjustment to the scoring computing system.

8. The computer readable medium of claim 7, wherein the operations further comprise:
   receiving, from the scoring computing system, a signed acknowledgment indicating that the score adjustment had been received by the scoring computing system; and providing the signed acknowledgement to the service computing system.

9. The computer readable medium of claim 1, wherein the provided non-anonymous identifier indicative of the user's identity includes a user identifier that uniquely identifies the user and a device identifier that identifies a type of the computing device.

10. The computer readable medium of claim 1, wherein the operations further comprise:
generating the anonymous identifier in response to a request from the user to obfuscate the identity of the user.

11. A computing device, comprising:
one or more processors:
memory having program instructions stored therein that are executable by the one or more processors to cause the computing device to perform operations including:
providing, to a service computing system, a service request that identifies an action and includes an anonymous identifier for a user of the computing device;
receiving, from the service computing system, a score request for a trustworthiness score indicative of the user's trustworthiness;
in response to receiving the score request from the service computing system, providing a non-anonymous identifier indicative of the user's identity to a scoring computing system;
receiving the trustworthiness score and a corresponding score signature from the scoring computing system; and
in response to receiving the score and the score signature from the scoring computing system, providing the score to the service computing system and without providing the non-anonymous identifier indicative of the user's identity to the service computing system.

12. The computing device of claim 11, wherein the operations further include:
receiving, from the service computing system, information generated in response to performance of the action by the service computing system.

13. The computing device of claim 11, wherein the operations further include:
in response to receiving the score and the score signature from the scoring computing system, sending the score signature to the service computing system.

14. The computing device of claim 11, wherein the operations further include:
in response to receiving the score and the score signature from the scoring computing system:
generating a second score signature based on the score signature received from the scoring computing system; and
sending the second score signature to the service computing system.

15. The computing device of claim 11, wherein the operations further comprise:
conveying, from the service computing system to the scoring computing system, a score adjustment determined by the service computing system based the user's interaction with a service provided by the service computing system.

16. A method, comprising:
providing, by a computing device to a service computing system, a service request that identifies an action and includes an anonymous identifier for a user of the computing device;
receiving, by the computing device from the service computing system, a score request for a trustworthiness score indicative of the user's trustworthiness;
in response to receiving the score request from the service computing system, providing, by the computing device, a non-anonymous identifier indicative of the user's identity to a scoring computing system;
receiving, by the computing device, the trustworthiness score and a corresponding score signature from the scoring computing system; and
in response to receiving the score and the score signature from the scoring computing system, providing, by the computing device, the score to the service computing system and without providing the non-anonymous identifier indicative of the user's identity to the service computing system.

17. The method of claim 16, further comprising:
providing, by the computing device to the scoring computing system, a score adjustment determined based the user's interaction with a service provided by the service computing system.

18. The method of claim 17, further comprising:
providing, by the computing device to the service computing system, a signed acknowledgment indicating that the score adjustment had been received by the scoring computing system.

19. The method of claim 16, wherein the provided non-anonymous identifier indicative of the user's identity includes a user identifier that uniquely identifies the user and a device identifier that identifies a type of the computing device.

20. The method of claim 16, further comprising:
generating, by the computing device, the anonymous identifier in response to a request from the user to obfuscate the identity of the user.

* * * * *